(12) United States Patent
Fujita

(10) Patent No.: US 8,158,303 B2
(45) Date of Patent: Apr. 17, 2012

(54) FUEL CELL SYSTEM WITH ANTIFREEZE STRUCTURE

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 429 days.

(21) Appl. No.: 12/084,234

(22) PCT Filed: Nov. 16, 2006

(86) PCT No.: PCT/JP2006/322863
§ 371 (c)(1),
(2), (4) Date: Apr. 28, 2008

(87) PCT Pub. No.: WO2007/063715
PCT Pub. Date: Jun. 7, 2007

(65) Prior Publication Data
US 2009/0258277 A1    Oct. 15, 2009

(30) Foreign Application Priority Data
Dec. 2, 2005  (JP) .................................. 2005-349337

(51) Int. Cl.
H01M 8/04       (2006.01)
(52) U.S. Cl. ........................................ 429/512; 429/434
(58) Field of Classification Search ............... 429/20, 429/24, 34, 38, 39
See application file for complete search history.

(56) References Cited

U.S. PATENT DOCUMENTS

| 2002/0094469 A1* | 7/2002 | Yoshizumi et al. ............. 429/34 |
| 2003/0077488 A1* | 4/2003 | Yamamoto et al. ............. 429/17 |

FOREIGN PATENT DOCUMENTS

| DE | 102 01 668 A1 | 11/2002 |
| JP | 2002-289237 A | 10/2002 |
| JP | 2002-313389 A | 10/2002 |
| JP | 2003-132915 A | 5/2003 |
| JP | 2005-259494 A | 9/2005 |
| WO | 2005/104282 A1 | 11/2005 |

OTHER PUBLICATIONS

Office Action issued on Sep. 9, 2011 in German Patent Application No. 11 2006 003 156.2 and English translation thereof.

* cited by examiner

*Primary Examiner* — Barbara Gilliam
*Assistant Examiner* — Stephan Essex
(74) *Attorney, Agent, or Firm* — Kenyon & Kenyon LLP

(57) ABSTRACT

A fuel cell system includes a fuel cell body that generates electricity through electrochemical reaction of a first reactive gas and a second reactive gas, a first gas supply passage and a second gas supply passage supplying the first reactive gas and the second reactive gas to the fuel cell body, a first gas discharge passage and a second gas discharge passage discharging an off-gas of the first reactive gas and an off-gas of the second reactive gas from the fuel cell body, and a branch passage branching out from one of the first gas discharge passage or the second gas discharge passage. The off-gas discharged by the other one of the first gas discharge passage or the second gas discharge passage is arranged to flow through the branch passage.

5 Claims, 3 Drawing Sheets

FUEL CELL SYSTEM WITH ANTIFREEZE STRUCTURE

This is a 371 national phase application of PCT/JP2006/322863 filed 16 Nov. 2006, claiming priority to Japanese Patent Application No. 2005-349337 filed 2 Dec. 2005, the contents of which are incorporated herein by reference.

TECHNICAL FIELD

The present invention relates to a fuel cell system.

BACKGROUND ART

A fuel cell system is configured to supply a fuel gas and an oxidizing agent gas to a fuel cell via corresponding gas supply passages to generate electricity through electrochemical reaction of these gases within a fuel cell body. Water is generated in the fuel cell body by the electrochemical reaction, and this water is contained in an oxidizing agent off-gas (an oxidizing agent gas discharged from the fuel cell body) that is discharged from the fuel cell body. It is noted that water is also normally contained in a fuel off-gas (a fuel gas discharged from the fuel cell body) since fuel gas is supplied to the fuel cell body via an electrolyte.

Therefore, if the outside air temperature falls to the freezing point or lower when the fuel cell system is at a standstill, the moisture contained in the gases remaining in the valves, pipes, and other component parts arranged in the gas passages of the system may condense and freeze. In such a case, it may not be possible to activate the fuel cell system even when appropriate measures are taken to activate the fuel cell system; or even when the system is activated, the system may not operate properly, for example.

In view of such a problem, a method is proposed for removing residual moisture by scavenging the oxidizing agent gas passage and the fuel gas passage of the fuel cell system using an oxidizing agent gas (air) supplied from a compressor prior to halting the fuel cell system (See Japanese Laid-Open Patent Application No. 2002-313395).

DISCLOSURE OF THE INVENTION

The Problem to be Solved by the Invention

However, even if the technique disclosed in the above document is used to remove residual moisture within the fuel cell system before halting the system, when this system is activated under a lower temperature environment thereafter, water is still generated by the electrochemical reaction occurring within the fuel cell. In this case, since main passages have high temperature gases such as the fuel off-gas or the oxidizing agent off-gas constantly circulating therein, pipes and valves arranged in these main passages may come into direct contact with these high temperature gases and be warmed by these gases so that freezing is not likely to occur at these parts during operation of the system. However, valves and pipes that are located relatively far away from the main passages may not come into contact with such high temperature gases so that their temperatures may be close to the outside air temperature even when the system is in operation. Accordingly, when water generated by the electrochemical reaction occurring within the fuel cell after system activation comes into contact with such low temperature valves and pipes, freezing may occur at these parts even when the system is in operation. It is particularly noted that when freezing occurs within pipes, the pipes may be blocked and the system may be prevented from properly operating, for example.

Aspects of the present invention are directed to solving one or more of the above-described problems. According to one aspect of the present invention, a fuel cell system is provided that is capable of efficiently preventing freezing of component parts that cannot readily receive heat from the fuel cell under a low temperature environment.

Means for Solving the Problem

According to one embodiment of the present invention, there is disclosed a fuel cell system including a fuel cell body that generates electricity through electrochemical reaction of a first reactive gas and a second reactive gas, a first gas supply passage and a second gas supply passage respectively supplying the first reactive gas and the second reactive gas to the fuel cell body, a first gas discharge passage and a second gas discharge passage respectively discharging an off-gas of the first reactive gas and an off-gas of the second reactive gas from the fuel cell body, and a branch passage branching out from one of the first gas discharge passage or the second gas discharge passage, wherein the off-gas discharged by the other one of the first gas discharge passage or the second gas discharge passage is arranged to flow through the branch passage.

In one aspect of the present embodiment, component parts such as pipes or valves arranged in a branch passage for one type of off-gas that do not regularly come into contact with a high temperature off-gas and are therefore prone to freezing under a low temperature environment may be efficiently warmed by the heat of another type of off-gas from a discharge passage for this other type of off-gas so that freezing of these component parts may be prevented.

According to one preferred embodiment, the fuel cell system may include a bypass passage that conveys the off-gas of the other one of the gas discharge passages to the branch passage. It is noted that conveying the off-gas to the branch passage may refer to introducing the off-gas of a relevant reactive gas directly into the branch passage as well as introducing the off-gas of the relevant reactive gas to a neighboring area of the branch passage to transmit heat of the off-gas to the branch passage. By providing such a bypass passage, the above-described advantageous effects of the present invention may be more reliably achieved.

According to another preferred embodiment, the fuel cell system may further include an adjusting unit for introducing the off-gas of the other one of the discharge passages into the bypass passage. In this case, the off-gas may be reliably introduced into the bypass passage by the adjusting unit so that freezing of relevant component parts may be prevented more efficiently.

According to another preferred embodiment, a solenoid valve may be arranged within the branch passage at a position upstream of a junction point of the branch passage and the bypass passage, and the adjusting unit may be operated to introduce the off-gas of the other one of the discharge passages into the bypass passage when the solenoid valve is closed. In this way, the off-gas of the relevant reactive gas supplied from the bypass passage may be prevented from flow backwards within the branch passage.

According to another preferred embodiment of the present invention, the branch passage may be arranged into a double pipe structure including two passages, and the off-gas of the other one of the discharge passages conveyed from the bypass passage may be arranged to flow through one of the two passages. In this case, the off-gas of the relevant reactive gas may be prevented from flowing backwards, and the above-described solenoid valve may not be necessary.

According to another preferred embodiment of the present invention, the branch passage may be for discharging gas containing moisture that is processed by a gas/liquid separating unit.

According to another preferred embodiment of the present invention, the first gas discharge passage may be connected to the first gas supply passage, and the branch passage may be for discharging the first reactive gas out of the system.

According to another preferred embodiment of the present invention, the adjusting unit may have an opening that is adjusted for distributing the off-gas flowing in the other one of the discharge passages to the bypass passage and the other one of the discharge passages to which the bypass passage is connected. In this way, even when the off-gas of the relevant reactive gas is introduced into the bypass passage, the back pressure of the discharge passage for the off-gas may be prevented from overly increasing and fuel mileage degradation of the system resulting from an increase in the power load may be prevented.

According to further preferred embodiment, the opening of the adjusting unit may be arranged to vary depending on a temperature of the branch passage to which the bypass passage is connected and/or an outside air temperature. In this way, antifreeze operations may be performed even more efficiently.

According to another preferred embodiment, the branch passage may include a first valve, the branch passage may be connected to the other one of the discharge passages, and an additional discharge passage may be arranged between the first valve and the other one of the discharge passages which additional discharge passage may include a second valve. With such a system configuration, preventive measures against freezing of component parts such as pipes and valves arranged within the branch passage may be implemented without having to newly add the above-described bypass passage and adjusting unit to the system.

Effects of the Invention

In a fuel cell system according to an embodiment of the present invention, antifreeze measures may be efficiently implemented with respect to component parts such as pipes that are positioned relatively far away from a fuel cell and cannot readily receive heat from the fuel cell so that the fuel cell system may be properly operated even under a low temperature environment.

Figure 1:
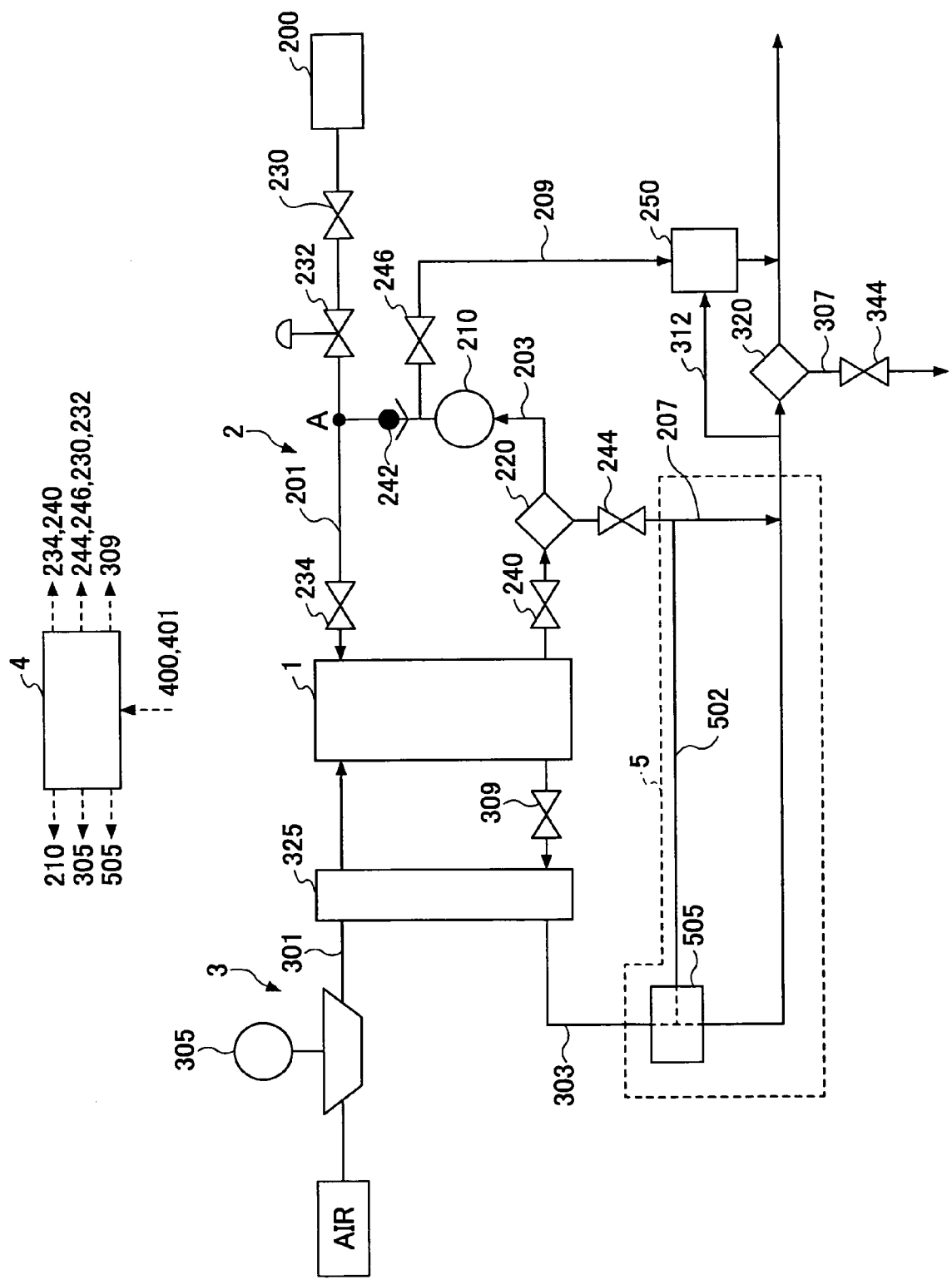
FIG. 1 is a diagram showing a configuration of a fuel cell system according to an embodiment of the present invention.

DESCRIPTION OF REFERENCE NUMERALS 1 fuel cell body
2 fuel gas passage
3 oxidizing agent gas passage
4 control unit
5 subject area
200 high-pressure hydrogen tank
201 fuel gas supply passage
203 circulation passage
207 first branch passage
209 second branch passage
210 hydrogen pump
220 gas/liquid separator for fuel off-gas
230, 234, 240, 244, 246 solenoid valves
232 pressure reduction control valve
242 non-return valve
250 dilution device
301 oxidizing agent gas supply passage
303 oxidizing agent off-gas discharge passage
305 compressor
307 downstream branch passage
309, 344 solenoid valves
325 humidifier
312 oxidizing agent off-gas branch passage
320 gas/liquid separator for oxidizing agent off-gas
400 pressure measurement result
401 temperature measurement result
502 bypass passage
503 discharge tube
505 adjusting unit
510 solenoid valve

BEST MODE FOR CARRYING OUT THE INVENTION

In the following, preferred embodiments of the present invention are described with reference to the accompanying drawings.

FIG. 1 is a diagram showing a configuration of a fuel cell system according to an embodiment of the present invention. The illustrated system includes a fuel cell body 1 that generates electric power which may be used as a drive source of an automotive vehicle, for example. The fuel cell system further includes a fuel gas passage 2 for circulating a fuel gas-within the fuel cell system, an oxidizing agent gas passage 3 for circulating an oxidizing agent gas (air) within the fuel cell system, and a control unit 4. It is noted that in the example of FIG. 1, a freeze-proof part 5 including a first branch passage 207 branching out from a gas/liquid separator 220 (also referred to as 'subject area 5' hereinafter) is subject to antifreeze effects rendered by an embodiment of the present invention. Also, in the following, a fuel cell system that uses hydrogen gas as the fuel gas to be supplied to the fuel cell is described as an illustrative example.

The fuel gas passage (also referred to as 'hydrogen gas passage') 2 includes a fuel gas supply passage 201 for supplying a fuel gas from a source of hydrogen fuel, such as a high-pressure hydrogen tank 200, to the fuel cell body 1, and a fuel off-gas discharge passage 203 for discharging a fuel off-gas from the fuel cell body 1. It is noted that the fuel off-gas discharge passage 203 is actually configured to be a circulation passage that connects the fuel cell body 1 to the fuel gas supply passage 201 via a gas/liquid separator 220 and a hydrogen pump 210 as is described below. In the following descriptions, the fuel off-gas discharge passage 203 may be also referred to as 'circulation passage 203'. A first branch passage 207 and a second branch passage 209 are connected to the circulation passage 203.

The fuel gas supply passage 201 of the fuel gas passage 2 has a normally-closed solenoid valve 230 arranged toward a discharge port of the high-pressure hydrogen tank 200, and a pressure reduction control valve 232 and a normally-closed solenoid valve 234 arranged in this order in a direction toward the fuel body 1. On the other hand, the circulation passage 203 has a normally-closed pressure reduction control valve 240, a gas/liquid separator 220, a hydrogen pump 210, and a non-return valve 242 arranged in this order in a direction extending away from the fuel cell body 1. The first branch passage 207 is connected to the gas/liquid separator 220 via the normally-closed solenoid valve 244. The second branch passage 209 is connected to the circulation passage 203 at an intermediate point between the discharge port of the hydrogen pump 210 and the junction point A of the circulation passage 203 and the fuel gas supply passage 201. A normally-closed solenoid valve (purge valve) 246 and a dilution device 250 are arranged in the second branch passage 209, and the other end of the second branch passage 209 at the discharge port of the dilution device 250 is connected to an oxidizing agent off-gas discharge passage 303, which is described below. The other end of the first branch passage 207 is also connected to the oxidizing agent off-gas discharge passage 303.

On the other hand, the oxidizing agent gas passage 3 includes an oxidizing agent gas supply passage 301 for supplying an oxidizing agent gas to the fuel cell body 1, and an oxidizing agent off-gas discharge passage 303 for discharging an oxidizing agent off-gas from the fuel cell body 1.

A compressor 305 and a humidifier 325 are arranged in the oxidizing agent gas supply passage 301. The humidifier 325 is arranged in the oxidizing agent off-gas discharge passage 303, and a solenoid valve (air escape valve) 309 is arranged between the humidifier 325 and the fuel cell body 1. The oxidizing agent off-gas discharge passage 303 also includes an oxidizing agent off-gas branch passage 312 arranged at the downstream side of the subject area 5, which is described below, and this oxidizing agent off-gas branch passage 312 is connected to the dilution device 250. A gas/liquid separator 320 for the oxidizing agent off-gas is arranged further downstream of the oxidizing agent off-gas discharge passage 303, and this gas/liquid separator 320 is connected to a downstream branch passage 307 via a solenoid valve 344. It is noted that in certain embodiments, the dilution device 250 and the oxidizing agent off-gas branch passage 312 and/or the gas/liquid separator 320, the downstream branch passage 307, and the solenoid valve 344 may be omitted from the fuel cell system.

The control unit 4 controls the component parts such as valves 234, 240, 244, 246, 230, 232, 309, the hydrogen pump 210, and the compressor 305 in response to pressure measurement results 400 and temperature measurement results 401 received from pressure sensors and temperature sensors arranges at predetermined locations of the above-described passages. The control unit 4 also controls an adjusting unit 505 of the subject area 5 as is described below. It is noted that in this drawing, control lines between the control unit 4 and the component parts are omitted for the sake of convenience of illustration.

In the following, a normal flow of oxidizing agent gas is briefly described. In normal operations of the fuel cell system, the compressor 305 is driven by the control unit 4, so that the atmospheric air is captured as oxidizing agent gas, passes through the oxidizing agent gas supply passage 301, and is supplied to the fuel cell body 1 via the humidifier 325. The supplied oxidizing agent gas is consumed by the electrochemical reaction in the fuel cell body 1, and then discharged from the fuel cell body 1 as oxidizing agent off-gas. The discharged oxidizing agent off-gas passes through the oxidizing agent off-gas discharge passage 303, and it is discharged to the outside of the fuel cell system via the gas/liquid separator 320, for example.

Next, a description will be given of a flow of hydrogen gas. In normal operations of the fuel cell system, the solenoid valve 230 is opened by the control unit 4, so that hydrogen gas from the high-pressure hydrogen tank 200 is entered, and passes through the fuel gas supply passage 201, and its pressure is then reduced by the pressure reduction control valve 232. Thereafter, the hydrogen gas is supplied to the fuel cell body 1 via the solenoid valve 234. The supplied hydrogen gas is consumed by the electrochemical reaction in the fuel cell body 1 and is then discharged from the fuel cell body 1 as hydrogen-off-gas. The discharged hydrogen-off-gas, after passing through the circulation passage 203 and having moisture removed by the gas/liquid separator 220, is redirected to the fuel gas supply passage 201 via the hydrogen pump 210 to be re-supplied to the fuel cell body 1. It is noted that the non-return valve 242 is arranged between the hydrogen pump 210 and the junction point A of the fuel gas supply passage 201 and the circulation passage 203, and in such an arrangement, the hydrogen-off-gas being circulated does not flow backwards. Normally, the solenoid valves 244 and 246 in the first and second branch passages 207 and 209 are closed. When these valves are opened as is necessary, moisture-containing gas processed by the gas/liquid separator 220 and the hydrogen-off-gas that does not need to be circulated are discharged from corresponding branch passages. These liquids and/or gases are discharged out of the fuel cell system via the oxidizing agent off-gas discharge passage 303.

Next, the configuration and operations of the subject area 5 according to the present embodiment are described.

The subject area 5 includes a bypass passage 502 branching out from the oxidizing agent off-gas discharge passage 303 and the adjusting unit 505. More specifically, the freeze-proof part 5 corresponds to the area surrounded by a dotted line in FIG. 1 that includes a part of the oxidizing agent off-gas discharge passage 303 and a part of the first branch passage 207. It is noted that the adjusting unit 505 is a device for switching the gas flow direction from a first direction to a second direction and vice versa.

Normally, in a part of a fuel cell system that cannot readily receive heat of the fuel cell, such as the first branch passage 207, moisture remaining in the passage may freeze to cause blockage of the passage so that proper operations may not be performed. Such a phenomenon is particularly likely to occur when the fuel cell system is used in a low temperature environment of 0° C., for example. Specifically, freezing of the passage may occur at the above-described part of the fuel cell system even when the system is in operation. In the present embodiment, the subject area 5 is configured to circulate oxidizing agent off-gas through the bypass passage 502 as is necessary by controlling the adjusting unit 505 arrange at the junction point of the oxidizing agent off-gas discharge passage 303 and the bypass passage 502 with the control unit 4. In this way, heat exchange may be induced by circulating the high temperature oxidizing agent off-gas through the bypass passage 502 to prevent freezing of the first branch passage. In one particular embodiment, the adjusting unit 505 may be a variable guide device that is configured to adjust the amount of oxidizing agent off-gas circulated through the bypass passage 502. It is noted that the oxidizing agent off-gas, after circulating the bypass passage 502, passes through the first branch passage 207 to be recombined with the oxidizing agent off-gas in the oxidizing agent off-gas discharge passage 303 and discharged outside the fuel cell system.

Figure 2:
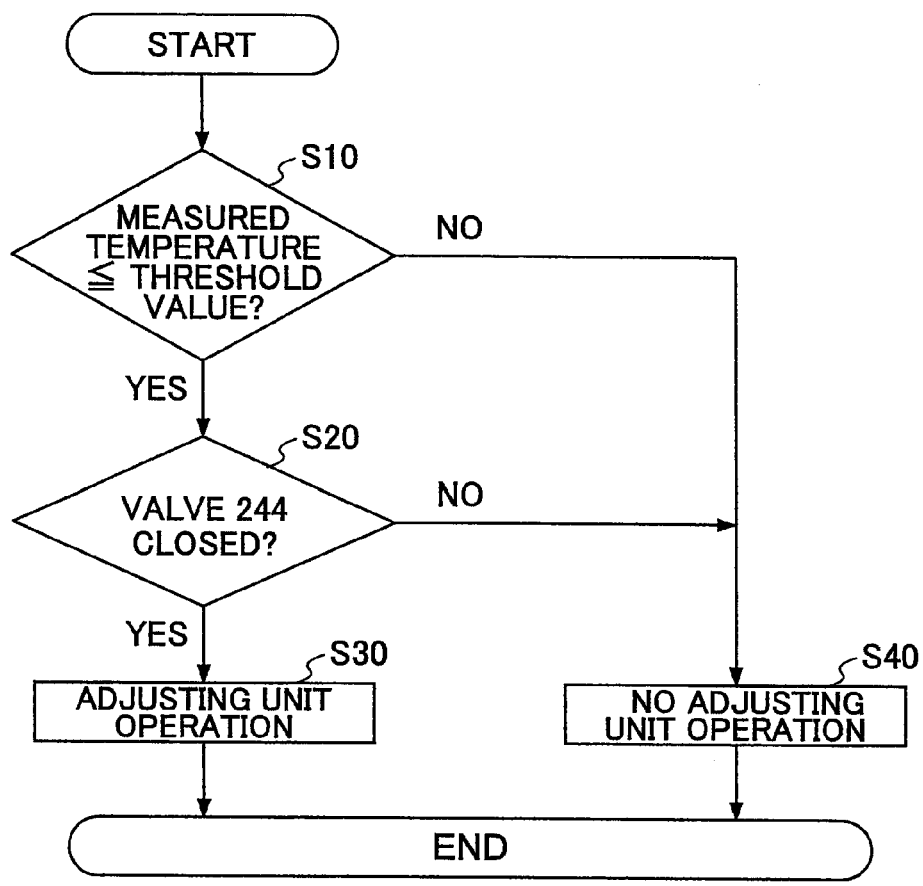
FIG. 2 is a flowchart illustrating operations of a freeze-proof part of the fuel cell system according to a first embodiment of the present invention.

In the following, the above-described operations are described in greater detail with reference to the flowchart of FIG. 2.

First, in step S10, the outside air temperature or the temperature of a subject pipe (i.e., the pipe temperature of the branch passage 207 in the example of FIG. 1) is measured, and the control unit 4 compares the measured temperature 401 with a predetermined threshold value to determine whether antifreeze operations have to be performed. If the measured temperature 401 is above the threshold value, the adjusting unit 505 is not operated by the control unit 4 so that the oxidizing agent off-gas is not circulated through the bypass passage 502; that is, the oxidizing agent off-gas only flows through the oxidizing agent off-gas discharge passage 303. On the other hand, if the measured temperature 401 is below the threshold value, the control unit 4 determines that antifreeze operations have to be performed on the subject area 5, and the process moves on to step S20.

In step S20, a determination is made as to whether the solenoid valve 244 of the gas/liquid separator 220 is open or closed. If the solenoid valve 244 is closed, the process moves on to step S30 where the adjusting unit 505 is operated to induce the oxidizing agent off-gas (normally a portion of the oxidizing agent off-gas) to branch out toward the bypass passage 502. In this way, high temperature gas may flow through the bypass passage 502 so that the first branch passage 207 may be warmed and prevented from freezing. In certain preferred embodiments, the opening of the adjusting unit 505 (the proportion of the oxidizing agent off-gas to be directed toward the bypass passage 502, provided that 100% signifies all the oxidizing agent off-gas being directed toward the bypass passage 502) may be arranged to vary depending on the measurement value 401 of the outside air temperature or the pipe temperature. In principle, as the opening of the adjusting unit 505 is increased, the back pressure of the oxidizing agent off-gas discharge passage 303 is increased and the load of a power unit (e.g., compressor 305) is increased to thereby cause degradation of the fuel mileage of the system. On the other hand, as the opening of the adjusting unit 505 is decreased, a longer period of time is required for obtaining antifreeze effects from the operations of the adjusting unit 505. Thus, if the opening of the adjusting unit 505 is arranged to be constant, either one of the above influences may stand out in certain cases. In this respect, by enabling the control unit 4 to adjust the opening of the adjusting unit 505, freezing of the low temperature part and fuel mileage degradation of the fuel cell system may be adequately prevented at the same time. It is noted that such adjustment operations may be performed by storing the relationship between the outside air temperature/pipe temperature and the opening of the adjusting unit 505 in the control unit 4 beforehand. In this way, for example, the control unit 4 may control the opening of the adjusting unit 505 to be higher when the temperature of the subject pipe is relatively low, and then, after the temperature of the subject pipe starts to increase due to heat exchange induced by the bypassed oxidizing agent off-gas, the control unit 4 may gradually control the opening of the adjusting unit 505 to decrease according to the temperature. On the other hand, if it is determined in step S20 that the solenoid valve 244 is open, the adjusting unit 505 is not operated. Such a measure is implemented in view of the fact that if the oxidizing agent off-gas flows from the oxidizing agent off-gas discharge passage 303 through the bypass passage 502 when the solenoid valve 244 is open, the oxidizing agent off-gas introduced into the first branch passage 207 may pass through the solenoid valve 244 and flow backwards within the first branch passage 207.

In the present embodiment, basically, the above-described process steps are repeatedly performed after activation of the fuel cell system and during system operation to prevent freezing of the low temperature part of the system on a continual basis.

In the following, the subject area 5 of the fuel cell system according to other embodiments of the present invention are described with reference to FIGS. 3 and 4.

Figure 3:
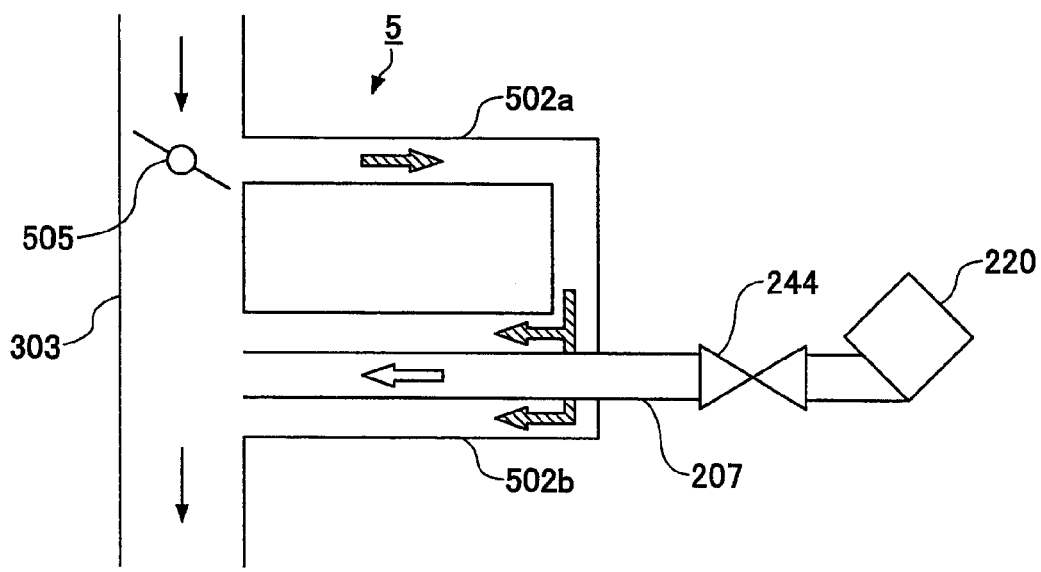
FIG. 3 is a diagram showing a freeze-proof part of the fuel cell system according to a second embodiment of the invention.
Figure 4:
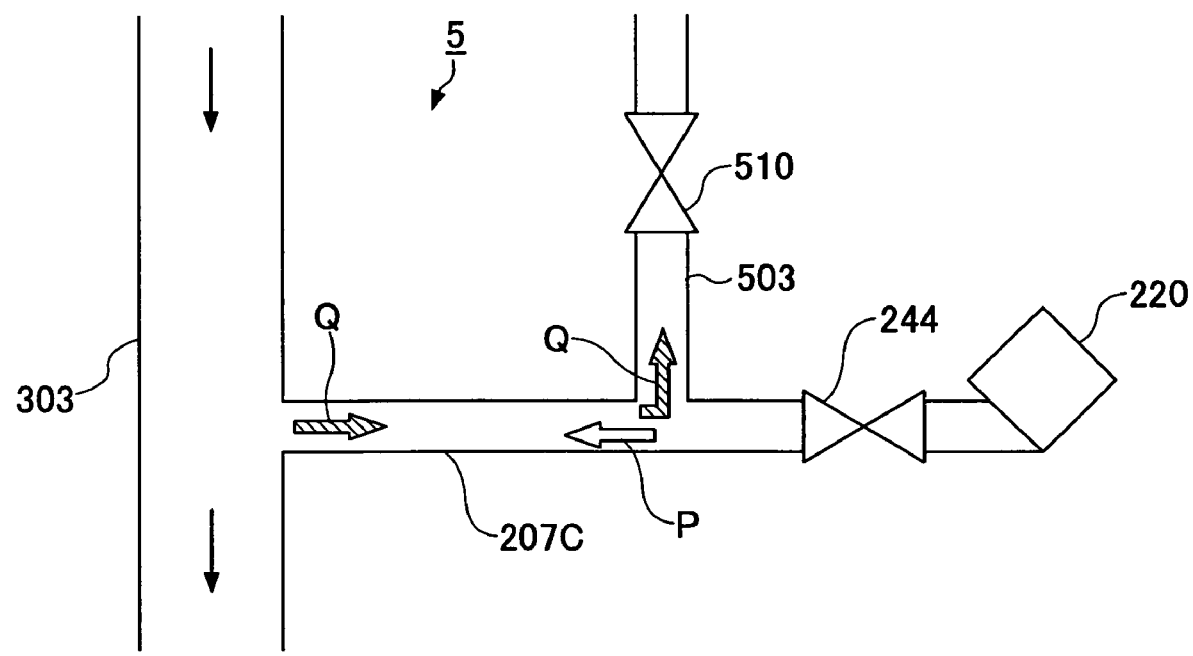
FIG. 4 is a diagram showing a freeze-proof part of the fuel cell system according to a third embodiment of the present invention.

As is shown in FIG. 3, a subject area 5 according to a second embodiment of the present invention has a first branch passage 207 that is arranged into a double pipe structure. Specifically, in the present embodiment, a passage for transferring a portion of the oxidizing agent off-gas from the oxidizing agent off-gas discharge passage 303 is made up of a bypass passage 502a and an outer passage 502b of the double pipe structure. The inner passage of the double pipe structure corresponds to a branch passage for transferring gas containing moisture that is separated by the gas/liquid separator 220. In the present embodiment, the oxidizing agent off-gas branching into the bypass passage 502a from the oxidizing agent off-gas discharge passage 303 is arranged to flow through the outer passage of the double pipe structure of the first branch passage 207 so that the inner passage of the double pipe structure may be prevented from freezing owing to heat exchange with the oxidizing agent off-gas. According to the present embodiment, the open/closed status of the solenoid valve 244 arranged at the downstream side of the gas/liquid separator 220 does not have to be taken into consideration when the control unit 4 controls operation of the adjusting unit 505. Specifically, in the present embodiment, even if the oxidizing agent off-gas is supplied to the bypass passage 502a when the solenoid valve 244 is open, backflow of the oxidizing agent off-gas toward the gas/liquid separator 220 side is not likely to occur. In this way, antifreeze operations may be performed more efficiently.

In a subject area 5 according to a third embodiment of the present invention, a bypass passage (i.e., 502 or 502a) does not have to be separately provided as in the above-described first and second embodiments. As is shown in FIG. 4, according to this embodiment, the subject area 5 includes a pipe 207C corresponding to the first branch passage 207, a discharge tube 503 branching out from the pipe 207C that is for discharging the oxidizing agent off-gas, and a solenoid valve 510 connected to the discharge tube 503. Normally, the solenoid valve 510 and the solenoid valve 244 are closed. In the case of gas containing moisture separated by the gas/liquid separator 220, only the solenoid valve 244 is opened, and the pipe 207C is used as a branch passage 207 for discharging gas containing moisture separated by the gas/liquid separator 220. It is noted that arrow P shown in FIG. 4 indicates the fluid flow direction in this case. On the other hand, during antifreeze operations, the pipe 207C is used as a bypass passage of the oxidizing agent off-gas discharge passage 303. Specifically, during antifreeze operations, the solenoid valve 244 is closed while the solenoid valve 510 is opened, and the oxidizing agent off-gas to be bypassed from the oxidizing agent off-gas discharge passage 303 flows within the pipe 207C in the direction of arrow Q shown in FIG. 4 to exchange heat with the pipe 207C after which the oxidizing agent off-gas is discharged from the discharge pipe 503. With such an arrangement, the oxidizing agent off-gas does not flow through the pipe 503 when the solenoid valve 510 is closed. On the other hand, when the solenoid valve 510 is open, back pressure of the passage of the pipe 503 becomes lower than that of the oxidizing agent off-gas discharge passage 303 to thereby cause the oxidizing agent off-gas to flow into the pipe 503. In this embodiment, the adjusting unit 505 becomes unnecessary. Also, according to the present embodiment, a dedicated bypass passage does not have to be newly added to an existing fuel cell system so that space may be conserved.

It is noted that in the above-described embodiments of the present invention, the first branch passage 207 is described as the part of the fuel cell system that is subject to antifreeze effects (subject area 5). However, application of the present invention is not limited to the first branch passage 207 as is described above and may also be applied to the second branch passage 209 and other various parts at which freezing it likely to occur.

Also, in the above descriptions, the oxidizing agent off-gas is used to prevent freezing of the branch passage connected to the fuel off-gas passage. However, the present invention is not limited to such an arrangement, and in one alternative embodiment, the fuel off-gas may be used to prevent freezing of a branch passage (e.g., downstream branch passage 307) connected to a passage for circulating the oxidizing agent off-gas. In this case, the expressions 'oxidizing agent off-gas' and 'oxidizing agent gas' used in the above descriptions of preferred embodiments may be replaced with the expressions 'fuel off-gas' and 'fuel gas' or 'hydrogen off-gas' and 'hydrogen gas' as is necessary to describe such alternative embodiment of the present invention.

Also, it is noted that the configuration of the fuel cell system described above is merely an illustrative example that does not limit the scope of the present invention. For example, a fuel cell system to which the present invention is applied may include additional component parts such as solenoid valves and pipes that are not shown in FIG. 1. Also, one or more of the component parts shown in FIG. 1 may be omitted.

The present application is based upon and claims the benefit of priority of Japanese patent application No. 2005-349337, filed on Dec. 2, 2005, the contents of which are incorporated by reference in their entirety.

The invention claimed is:

1. A fuel cell system including a fuel cell body that generates electricity through electrochemical reaction of a first reactive gas and a second reactive gas, a first gas supply passage and a second gas supply passage supplying the first reactive gas and the second reactive gas to the fuel cell body, a first gas discharge passage and a second gas discharge passage discharging an off-gas of the first reactive gas and an off-gas of the second reactive gas from the fuel cell body, the fuel cell system further comprising:
a branch passage branching out from one of the first gas discharge passage or the second gas discharge passage, wherein the off gas discharged by the other one of the first gas discharge passage or the second gas discharge passage is arranged to flow through the branch passage so as to heat the branch passage to a temperature sufficient to prevent any liquids contained in the branch passage from freezing;
a bypass passage that conveys the off-gas of the other one of the gas discharge passages to the branch passage; and
an adjusting unit configured to introduce the off-gas of the other one of the discharge passages into the bypass passage,
wherein the branch passage discharges, out of the system, gas containing moisture that is processed by a gas/liquid separating unit;
wherein the branch passage is arranged into a double pipe structure including two separate passages, and the off-gas of the other one of the discharge passages conveyed from the bypass passage is arranged to flow through one of the two passages; and
wherein the adjusting unit has an opening that is adjusted for distributing the off-gas flowing in the other one of the discharge passages to the bypass passage and the other one of the discharge passages to which the bypass passage is connected.

2. The fuel cell system as claimed in claim 1, further comprising:
a solenoid valve that is arranged within the branch passage at a position upstream of a junction point of the branch passage and the bypass passage, the adjusting unit being operated to introduce the off-gas of the other one of the discharge passages into the bypass passage when the solenoid valve is closed.

3. The fuel cell system as claimed in claim 1, wherein the first gas discharge passage is connected to the first gas supply passage, and the branch passage is for discharging the first reactive gas out of the system.

4. The fuel cell system as claimed in claim 1, wherein the opening of the adjusting unit is arranged to vary depending on a temperature of the branch passage to which the bypass passage is connected and/or an outside air temperature.

5. A fuel cell system including a fuel cell body that generates electricity through electrochemical reaction of a first reactive gas and a second reactive gas, a first gas supply passage and a second gas supply passage supplying the first reactive gas and the second reactive gas to the fuel cell body, a first gas discharge passage and a second gas discharge passage discharging an off-gas of the first reactive gas and an off-gas of the second reactive gas from the fuel cell body, the fuel cell system further comprising:
a branch passage branching out from one of the first gas discharge passage or the second gas discharge passage, wherein the off gas discharged by the other one of the first gas discharge passage or the second gas discharge passage is arranged to flow through the branch passage so as to heat the branch passage to a temperature sufficient to prevent any liquids contained in the branch passage from freezing;
wherein the branch passage discharges, out of the system, gas containing moisture that is processed by a gas/liquid separating unit;
wherein the branch passage includes a first valve;
wherein the branch passage is connected to the other one of the discharge passages;
wherein the branch passage is arranged into a double pipe structure including two separate passages, and the off-gas of the other one of the discharge passages conveyed from the bypass passage is arranged to flow through one of the two passages; and
wherein an additional discharge passage is arranged between the first valve and the other one of the discharge passages which additional discharge passage includes a second valve.

* * * * *